Aug. 14, 1962      B. A. SHADER ET AL      3,049,180
CULTIVATOR SPRING TRIP
Filed June 29, 1960
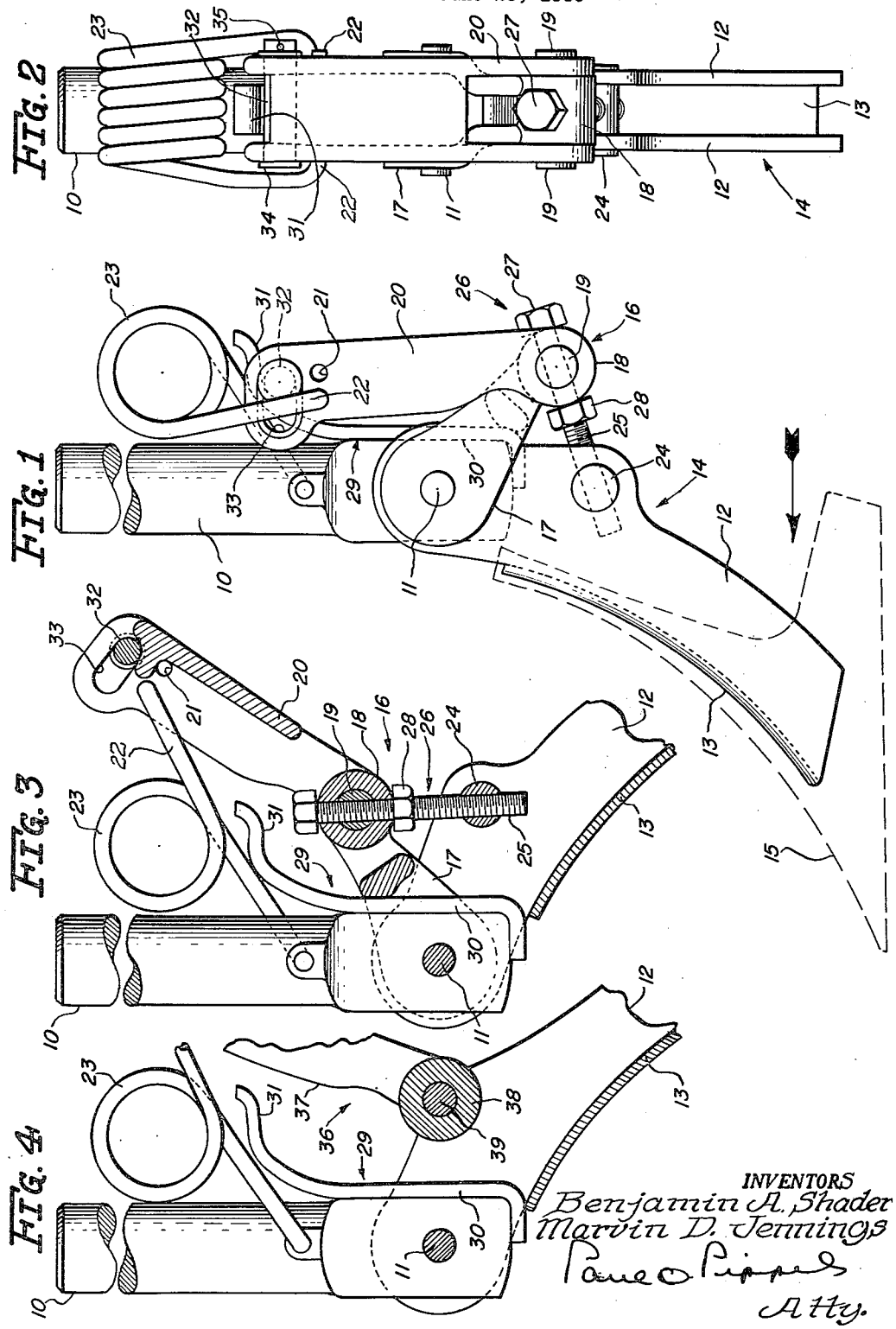
INVENTORS
Benjamin A. Shader
Marvin D. Jennings
Paul O. Pippel
Atty.

United States Patent Office 3,049,180
Patented Aug. 14, 1962

3,049,180
CULTIVATOR SPRING TRIP
Benjamin A. Shader, Hinsdale, and Marvin D. Jennings, Naperville, Ill., assignors to International Harvester Company, Chicago, Ill., a corporation of New Jersey
Filed June 29, 1960, Ser. No. 39,631
8 Claims. (Cl. 172—268)

This invention relates to agricultural implements and particularly to earth-working tools. More specifically, the invention concerns a safety trip for a cultivator or the like.

An object of the invention is the provision of an improved safety trip for an earth-working tool such as a cultivator, which is characterized by simplicity as well as efficiency, and is tripped in response to accurately predetermined over-load conditions.

Another object of the invention is the provision, in an earth-working tool such as a cultivator or the like, of an improved safety trip device which operates uniformly under adverse conditions tending to impair its efficiency.

Other objects and advantages of the invention will become clear from the following detailed description when read in conjunction with the accompanying drawings wherein:

FIGURE 1 is a view in side elevation of a cultivating unit incorporating the features of this invention, the cultivator shovel being shown in its operating position;

FIGURE 2 is a view from the rear of the structure shown in FIGURE 1;

FIGURE 3 is a detail, in section, showing the structure of FIGURE 1 in a tripped position of the earth-working tool; and FIGURE 4 is a view similar to FIGURE 3 of a modified form of the invention.

The safety spring trip of this invention is shown in its application to a cultivator comprising a shank 10, cylindrical in cross-section, flattened at its lower end and apertured to receive a transverse pivot pin 11 upon which are pivotally mounted a pair of plates 12 joined by a transverse plate 13 and forming a shoe 14 upon which is mounted an earth-penetrating tool in the form of a cultivator shovel indicated at 15 in FIGURE 1.

By virtue of the pivotal mounting of the upper end of the tool carrying shoe 12 upon the pivot pin 11, the shoe and the shovel mounted thereon are capable of swinging about the axis of the pin 11 rearwardly of the direction of travel of the implement from the operating position of FIGURE 1 to the tripped positions of FIGURES 3 and 4.

The cultivator is held against tripping in normal operating conditions but allowed to trip when abnormal conditions are encountered by the provision of novel tripping mechanism including link means 16. Link means 16 comprises a link member 17, in FIGURES 1 to 3, link 17 being bifurcated at one end and mounted upon the pivot pin or bolt 11. A boss 18 at the other end of link 17 is provided with trunnions 19 upon which is mounted the bifurcated lower end of a release link 20 provided with one or more transverse openings 21 in which is received the right angle portion 22 of one end of a torsion spring 23, the other end of which is inserted in an opening provided in the shank 10 and anchored there to bias the link means 16 to the position of FIGURE 1.

Link means 16 is connected to the shoe 12 by the provision of a transverse swivel 24 mounted in the shoe 12 and having a threaded opening to receive the threaded shank 25 of the bolt 26 passing through an opening provided in the boss 19.

The head 27 of bolt 26 engages one side of boss 18 and a nut 28 threaded on the shank 25 is adjustably engageable with the other side of the boss. The position of the axis of trunnions 18 forming the connection between links 17 and 20, with respect to the cultivator shovel, can be adjusted by loosening nut 28 and threading bolt 26 into the swivel 24.

It has already been noted that the linkage 16 moves to the tripped position of FIGURE 3 against the bias of torsion spring 23. However, the cultivator unit is held against tripping under normal operating conditions by the provision of a leaf spring 29 having a flattened main body portion 30 affixed to the lower portion of shank 10 and having its upper end curved outwardly and terminating in a bent portion in the form of an abutment 31 engageable in the operating position of the cultivator unit by a pin or roller 32 rotatably and slidably receivable in slots 33 formed in the upper end of release link 20. Roller 32 is held in the slots 33 by the provision of a head 34 at one end of the roller and a cotter key 35 at the other end thereof.

Pin or roller 32 engages the bent end of leaf spring 29 with a rolling friction which results in minimum wear to the roller and to the end of the spring. In response to abnormal ground forces acting upon the earth-penetrating shovel 15, release link 20 is forced upwardly against the abutment 31 of leaf spring 29, tending to straighten the spring and permit the pin 32 to roll over the end thereof to the tripped position of FIGURE 3. This action is opposed by the torsion spring 23 which returns the link means 16 and shovel to their normal operating positions.

In the modified form of the invention shown in FIGURE 4, link 17 which facilitates the adjustment of release link 20. is eliminated and is replaced by link means 36 which comprises only the release link 37 which is of substantially the same construction as link 20 in FIGURES 1 to 3. In this case the lower end of release link 37 has a boss 38 bored to receive a pivot pin 39 carried by the shoe 12.

It is believed that the novel cultivator trip mechanism of this invention will be clearly understood from the foregoing description. It should likewise be understood, however, that the invention has been described in its preferred embodiment only, and that modifications may be made therein without departing from the spirit of the invention or the scope of the appended claims.

What is claimed is:

1. A spring trip for a cultivator having a tool-carrying shank and a shovel pivotally mounted on the shank for pivoting with respect thereto between an operating and a non-operating tripped position, comprising link means having a connection at one end to the shovel and having pivotal movement relative thereto, spring means yieldably connecting the other end of the link means to said shank, the said other end of said link means being movable relative to the shank against the action of said spring when the shovel is tripped, a leaf spring affixed at one end to the shank and having its other end bent to form an abutment, and a pin carried by said other end of the link means and engageable with said abutment in the operating position of the shovel to prevent tripping of the shovel in the normal operation thereof.

2. The invention set forth in claim 1, wherein said pin is freely rotatably mounted in said link means.

3. The invention set forth in claim 2, wherein said link means is provided with a slot, and said pin is slidably and rotatably mounted in said slot.

4. The invention set forth in claim 1, wherein said first mentioned spring is a torsion spring anchored at one end to the shank and at the other end to said link means.

5. A spring trip for a cultivator having a tool-carrying shank and a shovel pivotally mounted on the shank for pivoting between an operating and a non-operating tripped position, comprising a pair of links, means forming a fulcrum therebetween interconnecting said links, means pivotally connecting said shovel to said links at said fulcrum, means pivotally connecting one of said links to the shank, and means yieldable to abnormal forces acting on the shovel for holding it in its operating position, comprising a pin carried by the other of said links, a leaf spring affixed to said shank having a portion thereof frictionally engageable with said pin, said leaf spring being yieldable to release said pin from engagement therewith and accommodate tripping of the shovel, and a second spring connecting said other link to said shank for returning the shovel to operating position.

6. A spring trip for a cultivator having a tool-carrying shank and a shovel pivotally mounted on the shank for pivoting between an operating and a non-operating tripped position, comprising a pair of links, means forming a fulcrum therebetween interconnecting said links, means pivotally connecting said shovel to said links at said fulcrum, means pivotally connecting one of said links to the shank, and means yieldable to abnormal forces acting on the shovel for holding it in its operating position, comprising a pin carried by the other of said links, a leaf spring affixed to said shank having a free bent end partly encircling said pin, said bent end being yieldable to release said pin and accommodate tripping of the shovel, and another spring connecting said other link to the shank and opposing the tripping of the shovel for returning the shovel to its operating position.

7. The invention set forth in claim 5, wherein said one of said links is pivotally mounted on said shank coaxially with said shovel.

8. A spring trip for an implement having a tool-carrying shank and a shovel pivotally mounted on the shank for pivoting with respect thereto between an operating and a non-operating tripped position, comprising a single link having a connection at one end to the shovel and having pivotal movement relative thereto, spring means yieldably connecting the other end of said link to said shank, the said other end of said link being movable relative to the shank against the action of said spring when the shovel is tripped, a leaf spring affixed at one end to the shank and having its other end bent to form an abutment, and a pin carried by said other end of the link and engageable with said abutment in the operating position of the shovel to prevent tripping of the shovel in the normal operation thereof, the force applied through said pin by the tripping of the shovel being in a direction to straighten said leaf spring.

References Cited in the file of this patent
UNITED STATES PATENTS

| | | |
|---|---|---|
| 274,962 | Nutting | Apr. 3, 1883 |
| 281,126 | Patterson | July 10, 1883 |
| 396,364 | Packer | Jan. 15, 1889 |
| 530,819 | Baker | Dec. 11, 1894 |
| 598,057 | Ovenshire | Jan. 25, 1898 |
| 2,395,342 | Morkoski | Feb. 19, 1946 |
| 2,575,510 | Brown | Nov. 20, 1951 |